D. LITTLE.
Whiffletree.
No. 3,020. Patented Mar 30, 1843.
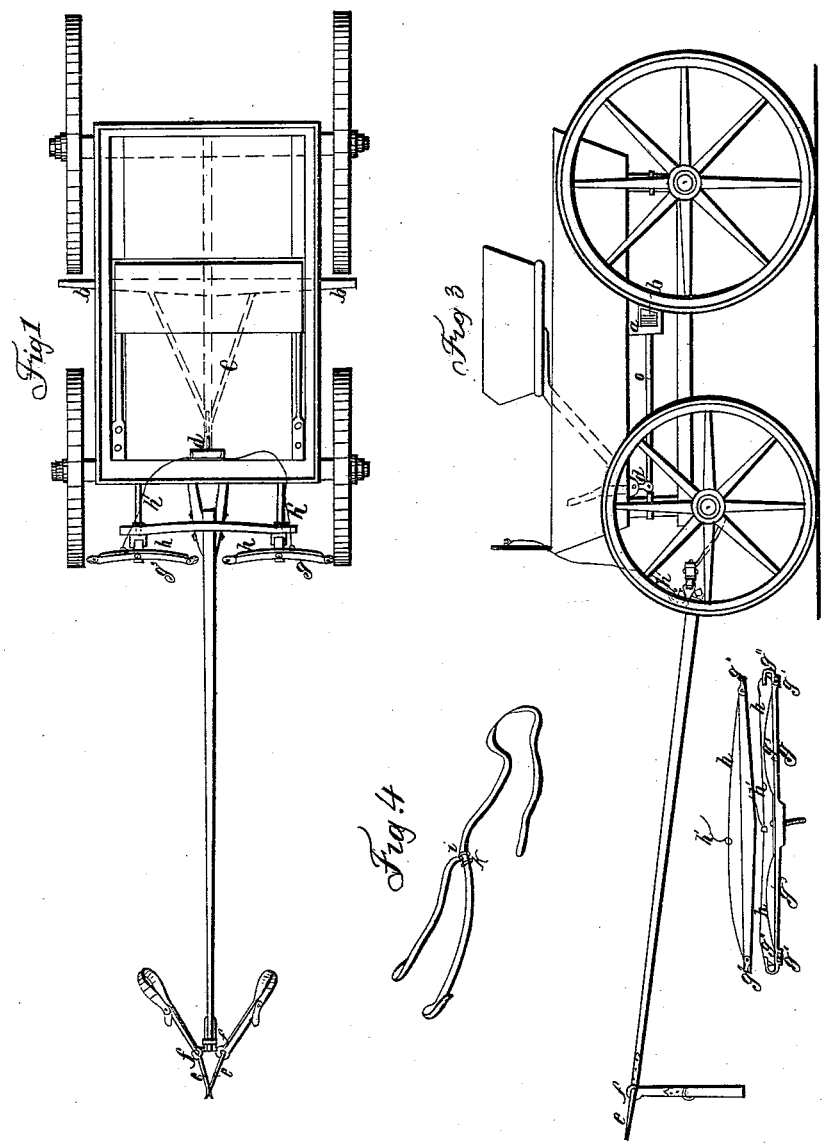

UNITED STATES PATENT OFFICE.

DAVID LITTLE, OF GETTYSBURG, PENNSYLVANIA.

IMPROVEMENT IN DISENGAGING HORSES FROM CARRIAGES.

Specification forming part of Letters Patent No. 3,020, dated March 30, 1843.

*To all whom it may concern:*

Be it known that I, DAVID LITTLE, of Gettysburg, in the county of Adams and State of Pennsylvania, have invented a new and useful Improvement in Detaching Horses from Carriages and from each other; and I do hereby declare that the following is a full, clear, and exact description thereof, reference being had to the accompanying drawings, making a part of this specification, in which—

Figure 1 is a top plan of running-gear; Fig. 2, parts detached; Fig. 3, side elevation, and Fig. 4, views.

The nature of my invention consists in an apparatus for detaching horses from carriages and from each other when they become restive or run away, and at the same time stopping the carriage.

The carriage is constructed like any now in common use. To the body on each side, just forward of the periphery of the hind wheels, there is a staple, $a$, affixed, in which a bar, $b$, running from side to side and projecting beyond the wheels, rests. To the center of this bar a rod, $c$, is attached, which projects forward and is connected by a joint with the lower end of an upright foot-lever, $d$, having its fulcrum in the bottom of the carriage. By bearing the upper end of this lever forward the cross-bar $b$ is brought in contact with the hind wheels and acts as a brake.

When the carriage is designed for two horses, the pole has attached to its forward end two pieces of iron $e$, one on each side. These are bent out from the end of the pole at right angles to it for a short space, and are then made to incline toward each other till they touch, thus forming a triangle. The extreme ends are then slightly turned outward from each other. They thus form hooks, onto which the rings $f$, attached to the pole-straps, can be slipped, and from which they cannot be disconnected without forcing the irons $e$ apart.

The whiffletrees to which the traces are fastened are constructed as follows: A bar of iron, $g$, of proper strength has a mortise, $g'$, passing through it horizontally at each end, the extreme ends being drawn out and curved upward and inward over the end of the spring $g^3$, where it is formed into a ring, $g''$. On this bar, on the upper side, there is a thin piece of spring-steel, $g^3$, extending from one mortise to the other. This is riveted to the bar at the center, and has a slight curve upward between it and the ends. On each end there is a pin attached, which projects down through a hole made for that purpose directly in the center of the mortise. The ends of the spring have holes in them, into which a string, $h$, is fastened, that reaches from one side to the other, passing up through the rings $g''$. On the ends of the whiffletree a loose ring is strung on this string, to which another string, $h'$, is tied, that extends up to the driver. When the horses are hitched to the carriage, the ends of the traces are put through the mortises $g$ in the whiffletree, and the pin on the end of the spring passes down through it. In detaching a horse that has become unmanageable the string $h'$ is pulled which raises the pin out of the mortise, and the horse goes clear, pulling the ring $f$ from the end of the pole.

The cross-reins shown in Fig. 4 are connected together simply by a ring, $i$, attached to the short one, through which the long one is drawn on the long rein. There is a buckle, $k$, disconnected with the short one. This can be changed into any hole along the long rein which prevents the ring $i$ from slipping farther forward than is desired. By this construction when the horses are let loose from the carriage they detach themselves from each other.

I claim—

1. The combination of the irons $e$ and rings $f$, constructed and arranged as above specified.

2. The combination of the buckle $k$ and ring $i$, attached to the cross-reins, for the purpose above set forth.

DAVID LITTLE.

Witnesses:
J. J. GREENOUGH,
GEO. F. MILLER.